(12) United States Patent
Rodrigo

(10) Patent No.: US 12,206,746 B2
(45) Date of Patent: Jan. 21, 2025

(54) BOUND SERVICE REQUEST HANDLING

(71) Applicant: Telefonaktiebolaget LM Ericsson (publ), Stockholm (SE)

(72) Inventor: Maria Cruz Bartolome Rodrigo, Madrid (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 1 day.

(21) Appl. No.: 18/006,400

(22) PCT Filed: Jun. 25, 2021

(86) PCT No.: PCT/EP2021/067508
§ 371 (c)(1),
(2) Date: Jan. 23, 2023

(87) PCT Pub. No.: WO2022/022908
PCT Pub. Date: Feb. 3, 2022

(65) Prior Publication Data
US 2024/0015232 A1 Jan. 11, 2024

(30) Foreign Application Priority Data
Jul. 31, 2020 (EP) .................................. 20382708

(51) Int. Cl.
*H04L 67/568* (2022.01)
*H04L 67/142* (2022.01)
(Continued)

(52) U.S. Cl.
CPC .......... *H04L 67/568* (2022.05); *H04L 67/142* (2013.01); *H04L 67/51* (2022.05); *H04L 67/562* (2022.05); *H04L 67/63* (2022.05)

(58) Field of Classification Search
CPC ....... H04L 67/568; H04L 67/51; H04L 67/63; H04L 67/562; H04L 67/14
See application file for complete search history.

(56) References Cited

U.S. PATENT DOCUMENTS

| | | | |
|---|---|---|---|
| 10,833,938 B1* | 11/2020 | Rajput | ............... H04L 67/1095 |
| 11,197,176 B2* | 12/2021 | Pokkunuri | ............ H04W 48/16 |
| 11,659,454 B2* | 5/2023 | Dao | ............... H04W 36/0033 370/331 |

OTHER PUBLICATIONS

ESTI "3GPP TS 29.500 V16.3.0; 3rd Generation Partnership Project; Technical Specification Group Core Network and Terminals; 5G System; Technical Realization of Service Based Architecture; Stage 3" (Year: 2020).*

(Continued)

*Primary Examiner* — Glenton B Burgess
*Assistant Examiner* — Patrick F Ngankam
(74) *Attorney, Agent, or Firm* — Weisberg I.P. Law, P.A.

(57) ABSTRACT

There is provided a method for handling a service request. The method is performed by a service communication proxy (SCP) node. The SCP node is configured to operate as an SCP between a first network function (NF) node of a service consumer and a second NF node of a service producer in the network. The method is performed in response to receiving, from the second NF node, a first response to a first request transmitted towards the second NF node via the SCP node. The first request is for the second NF node to provide a first service requested by the first NF node. Transmission of a second response is initiated towards the first NF node. The second response includes binding information irrespective of whether the binding information is present in the first response.

17 Claims, 9 Drawing Sheets

(51) Int. Cl.
    *H04L 67/51*         (2022.01)
    *H04L 67/562*       (2022.01)
    *H04L 67/63*         (2022.01)

(56) References Cited

OTHER PUBLICATIONS

ESTI "3GPP TS 29.500 V16.3.0" 5G System; Technical Realization of Service Based Architecture; Stage 3 (3GPP TS 29.500 version 16.6.0 Release 16), https://www.etsi.org/deliver/etsi_ts/129500_129599/129500/16.06.00_60/ts_129500v160600p.pdf (Year: 2020).*

International Search Report and Written Opinion dated Sep. 6, 2021 for International Application No. PCT/EP2021/067508 filed Jun. 25, 2021, 11-pages.

3GPP TS 23.501 V16.4.0; 3rd Generation Partnership Project; Technical Specification Group Services and System Aspects; System architecture for the 5G System (5GS); Stage 2 (Release 16); Mar. 2020, consisting of 430-pages.

3GPP TS 29.500 V16.3.0; 3rd Generation Partnership Project; Technical Specification Group Core Network and Terminals; 5G System; Technical Realization of Service Based Architecture; Stage 3 (Release 16); Mar. 2020, consisting of 65-pages.

* cited by examiner

BOUND SERVICE REQUEST HANDLING

CROSS-REFERENCE TO RELATED APPLICATIONS

This application is a Submission Under 35 U.S.C. § 371 for U.S. National Stage Patent Application of International Application No.: PCT/EP2021/067508, filed Jun. 25, 2021 entitled "BOUND SERVICE REQUEST HANDLING," which claims priority to European Application No.: 20382708.4, filed Jul. 31, 2020, entitled "SERVICE REQUEST HANDLING," the entireties of both of which are incorporated herein by reference.

TECHNICAL FIELD

The disclosure relates to methods for handling a service request in a network and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 V16.4.0. In more detail, FIG. 1A and 1B illustrates a system that uses direct communication, while FIGS. 1C and 1D illustrates a system that uses indirect communication.

In the systems illustrated in FIG. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF). Thus, in the system illustrated in FIG. 1B, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIG. 1C and D also comprise an NRF.

In the system illustrated in FIG. 1C, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

FIG. 2A-C is a signalling diagram illustrating an exchange of signals in an existing system, such as the system illustrated in FIG. 1D but it will be understood the issue described can also apply to the system illustrated in FIG. 1C. The system illustrated in FIG. 2A-C comprises a first SCP node 10, a first NF node 20 of a service consumer ("NFc"), a second NF node 30 of a service producer ("NFp1"), and a third NF node 70 of a service producer ("NFp2"). The first SCP node 10 is configured to operate as an SCP between the first NF node 20 and the second NF node 30. The second NF node 30 can provide (e.g. be configured to execute or run) a service 40 and the third NF node 70 can provide (e.g. be configured to execute or run) a service 80. The second NF node 30 and the third NF node 70 can provide (e.g. be configured to execute or run) the same service or a different service. The second NF node 30 and the third NF node 70 can be part of a set 402 of NF nodes of a service producer. The system illustrated in FIG. 2A-C also comprises a network repository function node 60.

In FIG. 2A-C, steps 600-620 relate to a first request for a user equipment (UE)/session context. As illustrated by block 500 of FIG. 2A-C, the UE/session context may be stored. As illustrated by block 600 of FIG. 2A-C, the first NF node 20 determines what discovery (and selection) parameters to use. More specifically, the first NF node 20 identifies the discovery parameters to include in the request. The discovery parameters are those that allow the first SCP node 10 to select the required NF node of the service producer. The discovery parameters can be associated with a certain service in a received request, which is not illustrated in FIG. 2A-C. As illustrated by block 502 of FIG. 2A-C, the first NF node 20 stores the UE/session context for the request received. This storage may be cached or externally stored.

As illustrated by arrow 602 of FIG. 2A-C, the first NF node 20 initiates transmission of a service request towards the first SCP node 10. Herein, this service request may be referred to as the "first request" 602. The service request is for an NF node to provide a first service 40 requested by the first NF node 20. The first NF node 20 may know via which SCP node to route the service request by configuration or other means. The first request comprises the address of this SCP node. In this illustration, this SCP node is the first SCP node 10. The discovery parameters are included in the service request. For example, the service request can comprise a hypertext transfer protocol (HTTP) header that identifies the parameters to be used for discovery and selection.

As illustrated by arrow 604 of FIG. 2A-C, the first SCP node 10 initiates transmission of a discovery request to the NRF node 60 to obtain NF profile(s) of one or more NF nodes of the service producer for the service that needs to be executed. The discovery request comprises the received discovery parameters. As illustrated by arrow 606 of FIG. 2A-C, the first SCP node 10 receives a response from the NRF node 60 comprising the NF profile(s) of one or more NF nodes of the service producer. As illustrated by block 608 of FIG. 2A-C, the first SCP node 10 selects one NF node of the service producer from the one(s) discovered using, for example, functional criteria (e.g. subscription permanent identifier (SUPI), network slice selection assistance information (NSSAI), data network name (DNN), etc.) and/or non-functional criteria (e.g. load, capacity, etc.). For the purpose of the illustration, it is assumed that the first SCP node 10 selects the second NF node 30.

As illustrated by block 610 of FIG. 2A-C, the first SCP node 10 replaces its own address (namely, the scp-address) in the received service request with the address of the selected second NF node 30. As illustrated by block 612 of FIG. 2A-C, the first SCP node 10 may perform any extra functionality, such as monitoring and/or tracing. As illustrated by arrow 614 of FIG. 2A-C, the first SCP node 10 initiates transmission of the service request towards the selected second NF node 30. Here, the service request is for the second NF node 30 to provide the first service 40 requested by the first NF node 20.

As illustrated by arrow 616 of FIG. 2A-C, the first SCP node 10 receives a response. Herein, this response may be referred to as the "first response" 616. The response 616 can comprise the result (e.g. that the service request is successful), some business logic (BL) information (e.g. as a result of providing the service), and/or location information. The location information is information indicative of a location of the resource in the second NF node 30 used when providing the first service 40. As illustrated by arrow 618 of FIG. 2A-C, the first SCP node 10 initiates transmission of the response towards the first NF node 20. As illustrated by blocks 504 and 620 of FIG. 2A-C, the first NF node 20 can store the information comprised in the response, e.g. the result, the BL information, and/or the location information. The information comprised in the response can be stored with the UE/session context.

In FIG. 2A-C, steps 622-642 relate to subsequent service requests for an existing UE/Session context. As illustrated by block 622 of FIG. 2A-C, another request (not illustrated) to execute a service is received by the first NF node 20 and this service request is identified to correspond to the same UE/session context in respect of which the earlier request was received. The first NF node 20 can, for example, determine the corresponding UE/session context based on the BL information. As illustrated by block 624 of FIG. 2A-C, the first NF node 20 extracts, from the location information, an address of the second NF node 30, which may be an application programming interface (API) root of a uniform resource identifier (URI) used to reach of the second NF node 30 (i.e. the sbi-target-apiroot).

As illustrated by arrow 626 of FIG. 2A-C, the first NF node 20 initiates transmission of a subsequent service request towards the first SCP node 10. Herein, this subsequent service request may be referred to as the "subsequent second request". The subsequent service request is for an NF node to provide a second service 40, 80 requested by the first NF node 20, which may be the same or a different service to the first service 40. The first NF node 20 may know via which SCP (e.g. in this illustration, the first SCP node 10) to route the service request by configuration or other means. The subsequent service request can comprise the address of the second NF node 30 (e.g. the sbi-target-apiroot). A hypertext transfer protocol (HTTP) header can comprise this address. As illustrated by block 628 of FIG. 2A-C, the first SCP node 10 replaces its own address (namely, the scp-address) in the received subsequent service request with the address of the second NF node 30 (e.g. the sbi-target-apiroot). As illustrated by block 630 of FIG. 2A-C, the first SCP node 10 may perform any extra functionality, such as monitoring and/or tracing.

As illustrated by arrow 632 of FIG. 2A-C, the first SCP node 10 initiates transmission of the subsequent service request towards the second NF node 30. Here, the service request is for the second NF node 30 to provide the second service 40, 80 requested by the first NF node 20. As illustrated by arrow 634 of FIG. 2A-C, there is an error response or a lack of response from the second NF node 30. As illustrated by block 636 of FIG. 2A-C, the first SCP node 10 identifies that a reselection of NF node is required, e.g. based on the error. However, as illustrated by block 638 of FIG. 2A-C, the first SCP node 10 has no means to select an alternative NF node. In particular, the first SCP node 10 does not have any information to be able to find an alternative NF node to be able to fulfil the subsequent service request. As illustrated by arrow 640 of FIG. 2A-C, the first SCP node 10 initiates transmission of a response to the first NF node 20. The response comprises information (e.g. an existing HTTP error, such as a 504 error) indicative that there is an error situation. As illustrated by block 642 of FIG. 2A-C, the procedure fails.

Moreover, as binding is not supported by the second NF node 30 (even though it may be supported by the first NF node 20 and the first SCP node 10), the first SCP node 10 is required to cache UE/session data. As the first SCP node 10 is the intermediary in all the communications, this uses up storage resources unnecessarily.

SUMMARY

It is an object of the disclosure to obviate or eliminate at least some of the above-described disadvantages associated with existing techniques.

Therefore, according to an aspect of the disclosure, there is provided a method for handling a service request in a network. The method is performed by a first service communication proxy (SCP) node that is configured to operate as an SCP between a first network function (NF) node of a service consumer and a second NF node of a service producer in the network. The method comprises initiating transmission of a second response towards the first NF node in response to receiving, from the second NF node, a first response to a first request transmitted towards the second NF node via the first SCP node. The first request is for the second NF node to provide a first service requested by the first NF node. The second response comprises binding information irrespective of whether the binding information is present in the first response. The binding information is indicative of one or more parameters by which the first NF node is bound when selecting a second service in an NF node of a service producer for a subsequent second request.

In some embodiments, the first service and the second service may be the same service or the first service and the second service may be different services.

In some embodiments, the one or more parameters may comprise a parameter that binds the first NF node to selecting the second service in the second NF node for the subsequent second request, or a parameter that binds the first NF node to selecting the second service in a third NF node for the subsequent second request, wherein a set of NF nodes of the service producer comprises the second NF node and the third NF node.

In some embodiments, the parameter that binds the first NF node to selecting the second service in the second NF node for the subsequent second request may comprise an identifier that identifies the second NF node and/or the parameter that binds the first NF node to selecting the second service in the third NF node for the subsequent second request may comprise an identifier that identifies the set of NF nodes.

In some embodiments, the binding information may be acquired from a memory of the first SCP node and/or from a network repository function (NRF) node.

In some embodiments, the method may comprise initiating transmission of a third request towards the NRF node for the binding information and initiating transmission of the second response towards the first NF node in response to receiving the binding information from the NRF node.

In some embodiments, if the binding information is present in the first response, the second response may be the same as the first response or the second response may be the first response updated to comprise modified binding information. In some embodiments, if the binding information is absent from the first response, the second response may be the first response updated to comprise the binding information.

In some embodiments, the method may comprise checking whether the binding information is present in or absent from the first response.

In some embodiments, the second response may comprise the binding information only if the first NF node supports being bound by the one or more parameters.

In some embodiments, the method may comprise checking whether the first NF node supports being bound by the one or more parameters.

In some embodiments, the method may comprise checking whether the first NF node supports being bound by the one or more parameters only if the binding information is absent from the first response.

In some embodiments, checking whether the first NF node supports being bound by the one or more parameters may comprise checking an NF profile of the first NF node to check whether the first NF node supports being bound by the one or more parameters.

In some embodiments, the first SCP node and the first NF node may be deployed in independent deployment units, and/or the first SCP node and the second NF node may be deployed in independent deployment units.

In some embodiments, the first SCP node may be deployed as a distributed network element.

In some embodiments, part of the first SCP node may be deployed in the same deployment unit as the first NF node, and/or part of the first SCP node may be deployed in the same deployment unit as the second NF node.

In some embodiments, at least one second SCP node may be configured to operate as an SCP between the first NF node (20) and the first SCP node, and/or at least one third SCP node may be configured to operate as an SCP between the first SCP node and the second NF node.

In some embodiments, the first SCP node and one or both of the at least one second SCP node and the at least one third SCP node may be deployed in independent deployment units.

In some embodiments, the at least one second SCP node and/or the at least one third SCP node may be deployed as distributed network elements.

In some embodiments, an entity may comprise the first SCP node and a network repository function (NRF) node.

According to another aspect of the disclosure, there is provided a first SCP node comprising processing circuitry configured to operate in accordance with the method described earlier.

In some embodiments, the first SCP node may comprise at least one memory for storing instructions which, when executed by the processing circuitry, cause the first SCP node to operate in accordance with the method described earlier.

According to another aspect of the disclosure, there is provided a computer program comprising instructions which, when executed by processing circuitry, cause the processing circuitry to perform the method as described earlier.

According to another aspect of the disclosure, there is provided a computer program product, embodied on a non-transitory machine-readable medium, comprising instructions which are executable by processing circuitry to cause the processing circuitry to perform the method as described earlier.

Thus, an improved technique for handling service requests in a network is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Herein, techniques for handling a service request in a network are described. A service request can also be referred to as a request for a service. Generally, a service is software intended to be managed for users. Herein, a service can be any type of service, such as a communication service (e.g. a notification service or a callback service), a context management (e.g. user equipment context management (UECM)) service, a data management (DM) service, or any other type of service. The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques described herein are implemented by a first service communication proxy (SCP) node and a first network function (NF) node.

An NF is a third generation partnership project (3GPP) adopted or 3GPP defined processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios.

Figure 3:
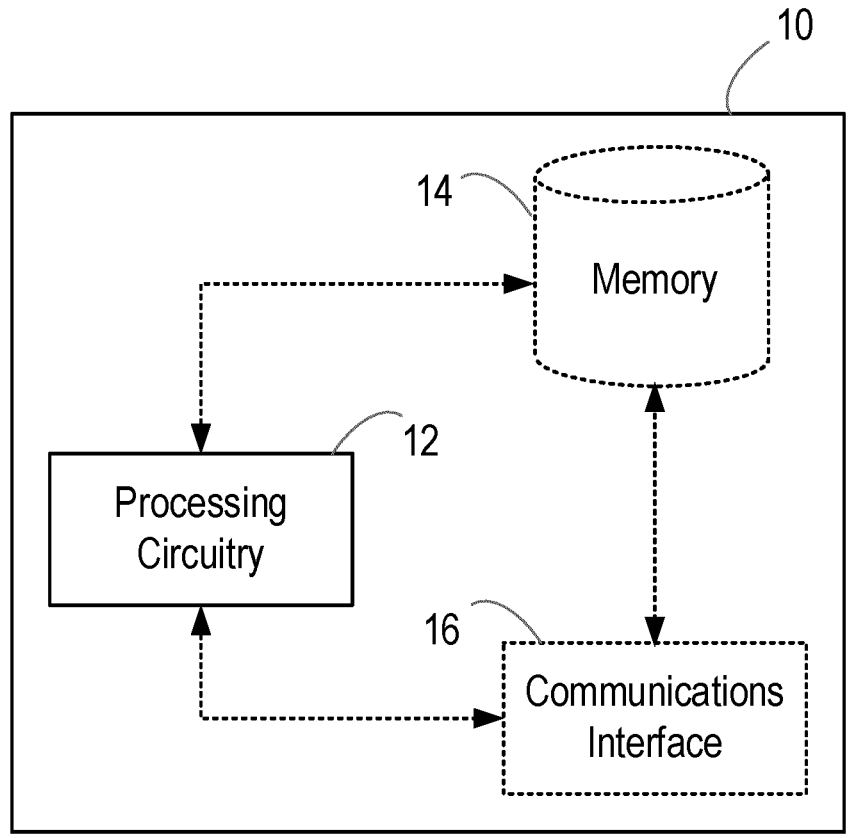
FIG. 3 is a block diagram illustrating a first service communication proxy (SCP) node according to an embodiment.

FIG. 3 illustrates a first SCP node 10 in accordance with an embodiment. The first SCP node 10 is for handling a service request in a network. The first SCP node 10 is configured to operate as an SCP between a first network function (NF) node of a service consumer and a second NF node of a service producer in the network. In some embodiments, the first SCP node 10 can be, for example, be a physical machine (e.g. a server) or a virtual machine (VM).

As illustrated in FIG. 3, the first SCP node 10 comprises processing circuitry (or logic) 12. The processing circuitry 12 controls the operation of the first SCP node 10 and can implement the method described herein in respect of the first SCP node 10. The processing circuitry 12 can be configured or programmed to control the first SCP node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first SCP node 10. In some embodiments, the processing circuitry 12 can be configured to run software to perform the method described herein in respect of the first SCP node 10. The software may be containerised according to some embodiments. Thus, in some embodiments, the processing circuitry 12 may be configured to run a container to perform the method described herein in respect of the first SCP node 10.

Briefly, the processing circuitry 12 of the first SCP node 10 is configured to operate in response to receiving, from the second NF node, a first response to a first request transmitted towards the second NF node via the first SCP node. The first request is for the second NF node to provide (e.g. execute or run) a first service requested by the first NF node. The processing circuitry 12 of the first SCP node 10 is configured to initiate transmission of a second response towards the first NF node. The second response comprises binding information irrespective of whether the binding information is present in the first response. The binding information is indicative of one or more parameters by which the first NF node is bound when selecting a second service in an NF node of a service producer for a subsequent second request.

As illustrated in FIG. 3, in some embodiments, the first SCP node 10 may optionally comprise a memory 14. The memory 14 of the first SCP node 10 can comprise a volatile memory or a non-volatile memory. In some embodiments, the memory 14 of the first SCP node 10 may comprise a non-transitory media. Examples of the memory 14 of the first SCP node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first SCP node 10 can be connected to the memory 14 of the first SCP node 10. In some embodiments, the memory 14 of the first SCP node 10 may be for storing program code or instructions which, when executed by the processing circuitry 12 of the first SCP node 10, cause the first SCP node 10 to operate in the manner described herein in respect of the first SCP node 10. For example, in some embodiments, the memory 14 of the first SCP node 10 may be configured to store program code or instructions that can be executed by the processing circuitry 12 of the first SCP node 10 to cause the first SCP node 10 to operate in accordance with the method described herein in respect of the first SCP node 10. Alternatively or in addition, the memory 14 of the first SCP node 10 can be configured to store any information, data, messages, requests, responses, indications, notifications, signals, or similar, that are described herein. The processing circuitry 12 of the first SCP node 10 may be configured to control the memory 14 of the first SCP node 10 to store information, data, messages, requests, responses, indications, notifications, signals, or similar, that are described herein.

In some embodiments, as illustrated in FIG. 3, the first SCP node 10 may optionally comprise a communications interface 16. The communications interface 16 of the first SCP node 10 can be connected to the processing circuitry 12 of the first SCP node 10 and/or the memory 14 of first SCP node 10. The communications interface 16 of the first SCP node 10 may be operable to allow the processing circuitry 12 of the first SCP node 10 to communicate with the memory 14 of the first SCP node 10 and/or vice versa. Similarly, the communications interface 16 of the first SCP node 10 may be operable to allow the processing circuitry 12 of the first SCP node 10 to communicate with the first NF node and/or any other node. The communications interface 16 of the first SCP node 10 can be configured to transmit and/or receive information, data, messages, requests, responses, indications, notifications, signals, or similar, that are described herein. In some embodiments, the processing circuitry 12 of the first SCP node 10 may be configured to control the communications interface 16 of the first SCP node 10 to transmit and/or receive information, data, messages, requests, responses, indications, notifications, signals, or similar, that are described herein.

Although the first SCP node 10 is illustrated in FIG. 3 as comprising a single memory 14, it will be appreciated that the first SCP node 10 may comprise at least one memory (i.e. a single memory or a plurality of memories) 14 that operate in the manner described herein. Similarly, although the first SCP node 10 is illustrated in FIG. 3 as comprising a single communications interface 16, it will be appreciated that the first SCP node 10 may comprise at least one communications interface (i.e. a single communications interface or a plurality of communications interfaces) 16 that operate in the manner described herein. It will also be appreciated that FIG. 3 only shows the components required to illustrate an embodiment of the first SCP node 10 and, in practical implementations, the first SCP node 10 may comprise additional or alternative components to those shown.

Figure 4:
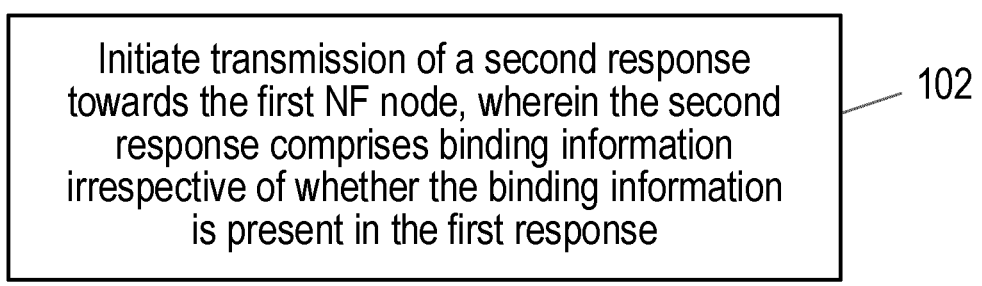
FIG. 4 is a flowchart illustrating a method performed by a first SCP node according to an embodiment.

FIG. 4 is a flowchart illustrating a method performed by a first SCP node 10 in accordance with an embodiment. The first SCP node 10 is configured to operate as an SCP between a first NF node of a service consumer and a second NF node of a service producer in the network. The method is for handling a service request in the network. The first SCP node 10 described earlier with reference to FIG. 3 is configured to operate in accordance with the method of FIG. 4. The method can be performed by or under the control of the processing circuitry 12 of the first SCP node 10.

The method of FIG. 4 is performed in response to receiving, from the second NF node, a first response to a first request transmitted towards the second NF node via the first SCP node. The first request is for the second NF node to provide (e.g. execute or run) a first service requested by the first NF node. As illustrated at block 102 of FIG. 4, transmission of a second response is initiated towards the first NF node. The second response comprises binding information irrespective of whether the binding information is present in the first response. The binding information is indicative of one or more parameters by which the first NF node is bound when selecting a second service in an NF node of a service producer for a subsequent second request.

Herein, the term "initiate" can mean, for example, cause or establish. Thus, the processing circuitry 12 of the first SCP node 10 can be configured to itself transmit the second response (e.g. via a communications interface 16 of the first SCP node 10) or can be configured to cause another node to transmit the second response.

Figure 5A:
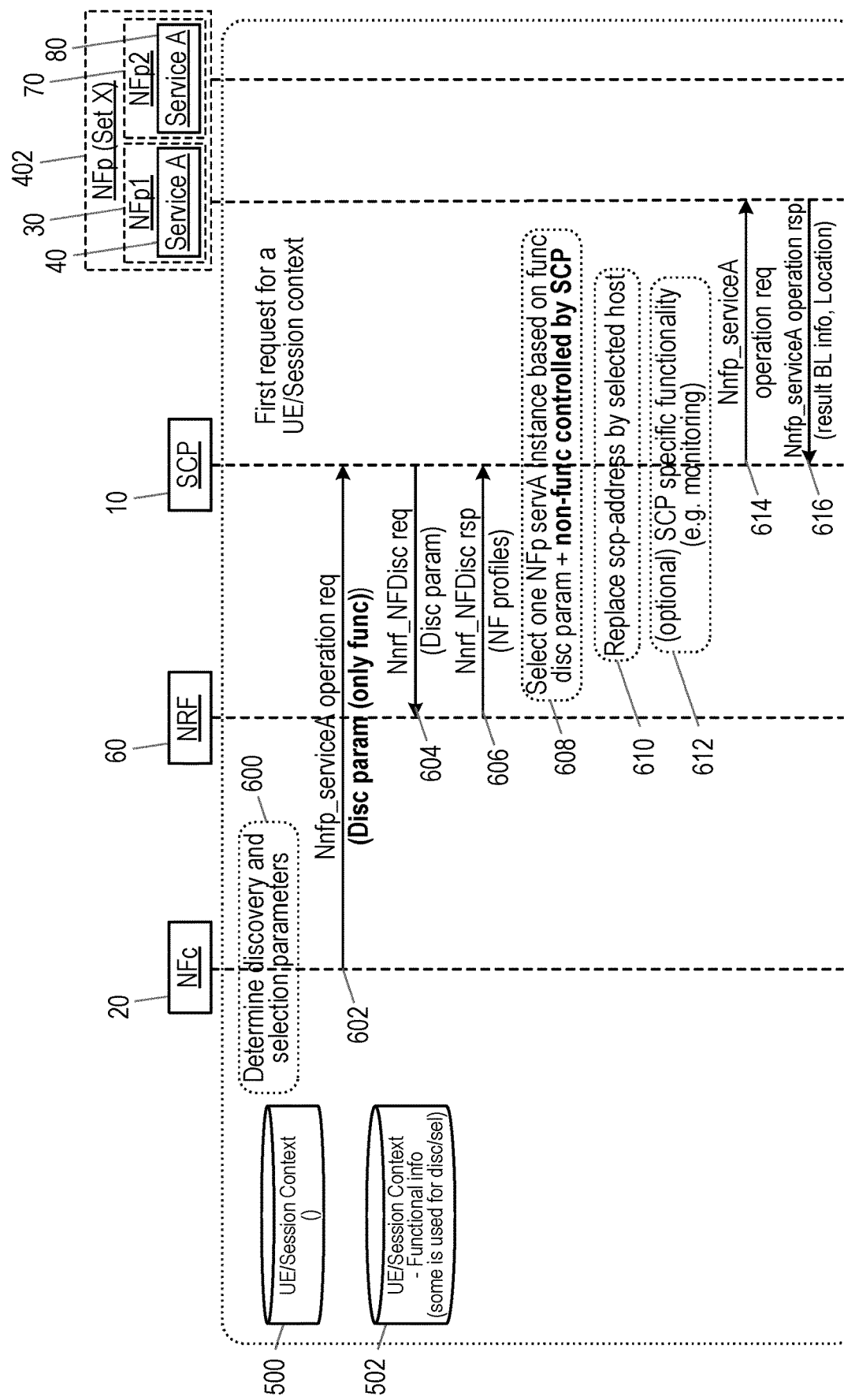
FIG. 5A-C is a signalling diagram illustrating an exchange of signals in a system according to an embodiment.
Figure 5B:
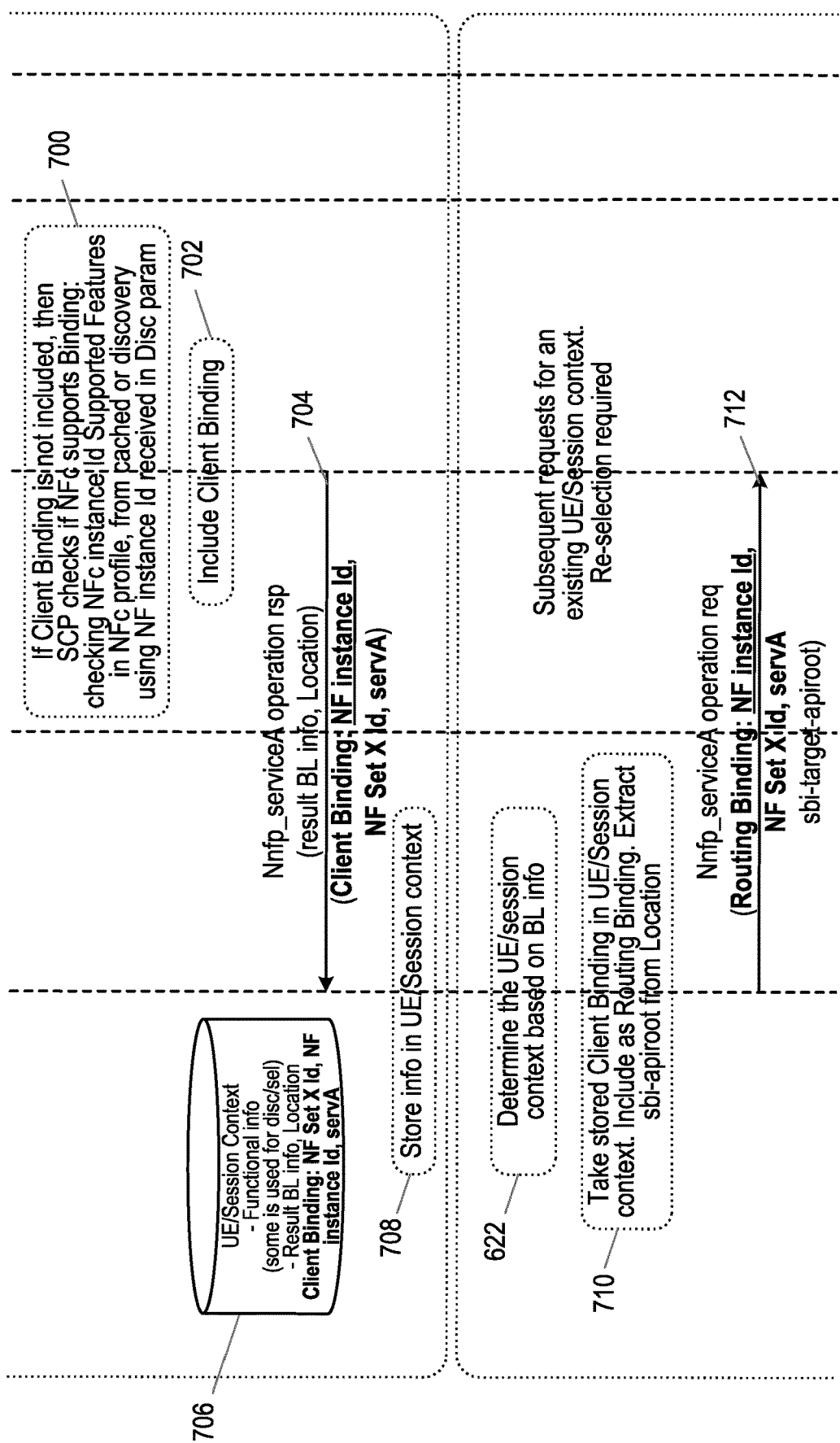
Figure 5C:
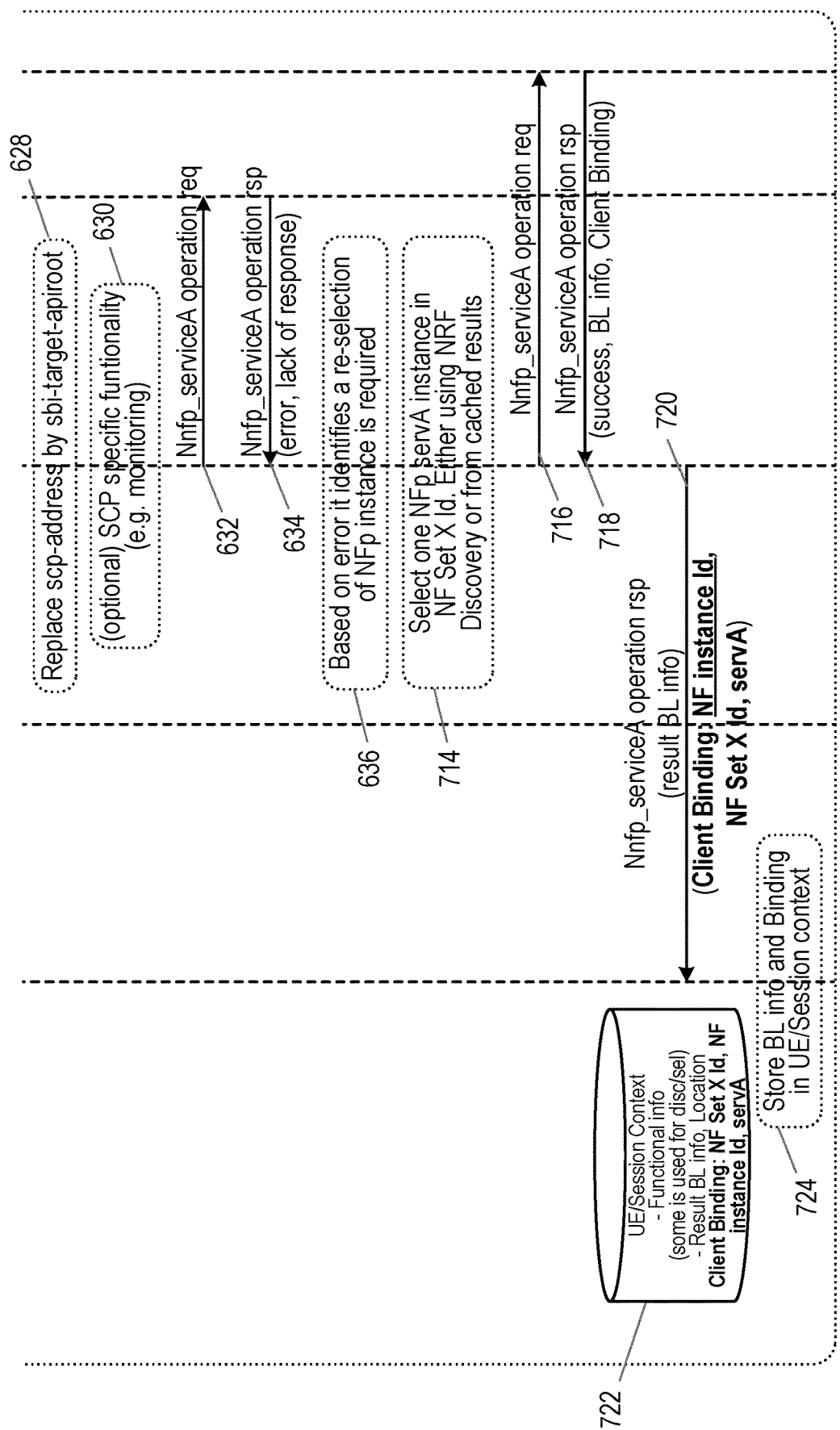

FIG. 5A-C is a signalling diagram illustrating an exchange of signals in a system according to an embodiment. The system illustrated in FIG. 5A-C comprises a first SCP node 10. The first SCP node 10 can be as described earlier with reference to FIGS. 3 and 4.

The system illustrated in FIG. 5A-C comprises a first NF node 20 of a service consumer ("NFc"), a second NF node 30 of a service producer ("NFp1"), and a third NF node 70 of a service producer ("NFp2"). The first SCP node 10 is configured to operate as an SCP between the first NF node 20 and the second NF node 30. The first SCP node 10 is also configured to operate as an SCP between the first NF node 20 and the third NF node 70. The second NF node 30 can be configured to run a service 40. The third NF node 70 can provide (e.g. can be configured to execute or run) a service 80. The second NF node 30 and the third NF node 70 can provide (e.g. can be configured to execute or run) the same service (e.g. different instances of the same service) or a different service. The second NF node 30 and the third NF node 70 can be part of a set 402 of NF nodes of a service producer. The system illustrated in FIG. 5A-C comprises a network repository function (NRF) node 60. In some embodiments, an entity may comprise the first SCP node 10 and the NRF node 60. That is, in some embodiments, the first SCP node 10 can be merged with the NRF node 60 in a combined entity.

In some embodiments, the first SCP node 10 and the first NF node 20 may be deployed in independent deployment units, the first SCP node 10 and the second NF node 30 may be deployed in independent deployment units, and/or the first SCP node 10 and the third NF node 70 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20, part (e.g. a service agent) of the first SCP node 10 may be deployed in the same deployment unit as the second NF node 30, and/or part (e.g. a service agent) of the first SCP node 10 may be deployed in the same deployment unit as the third NF node 70. Thus, an SCP node based on service mesh is possible, as described in 3GPP TS 23.501 V16.4.0.

In some embodiments, at least one second SCP node may be configured to operate as an SCP between the first NF node 20 and the first SCP node 10, at least one third SCP node may be configured to operate as an SCP between the first SCP node 10 and the second NF node 30, and/or at least one fourth SCP node may be configured to operate as an SCP between the first SCP node 10 and the third NF node 70. Thus, a multipath of SCP nodes is possible. In some of these embodiments, the first SCP node 10 and one or more of the at least one at least one second SCP node, the at least one third SCP node, and the at least one fourth SCP node may be deployed in independent deployment units. In some embodiments, the at least one second SCP node and/or the at least one third SCP node may be deployed as distributed network elements.

Figure 1:
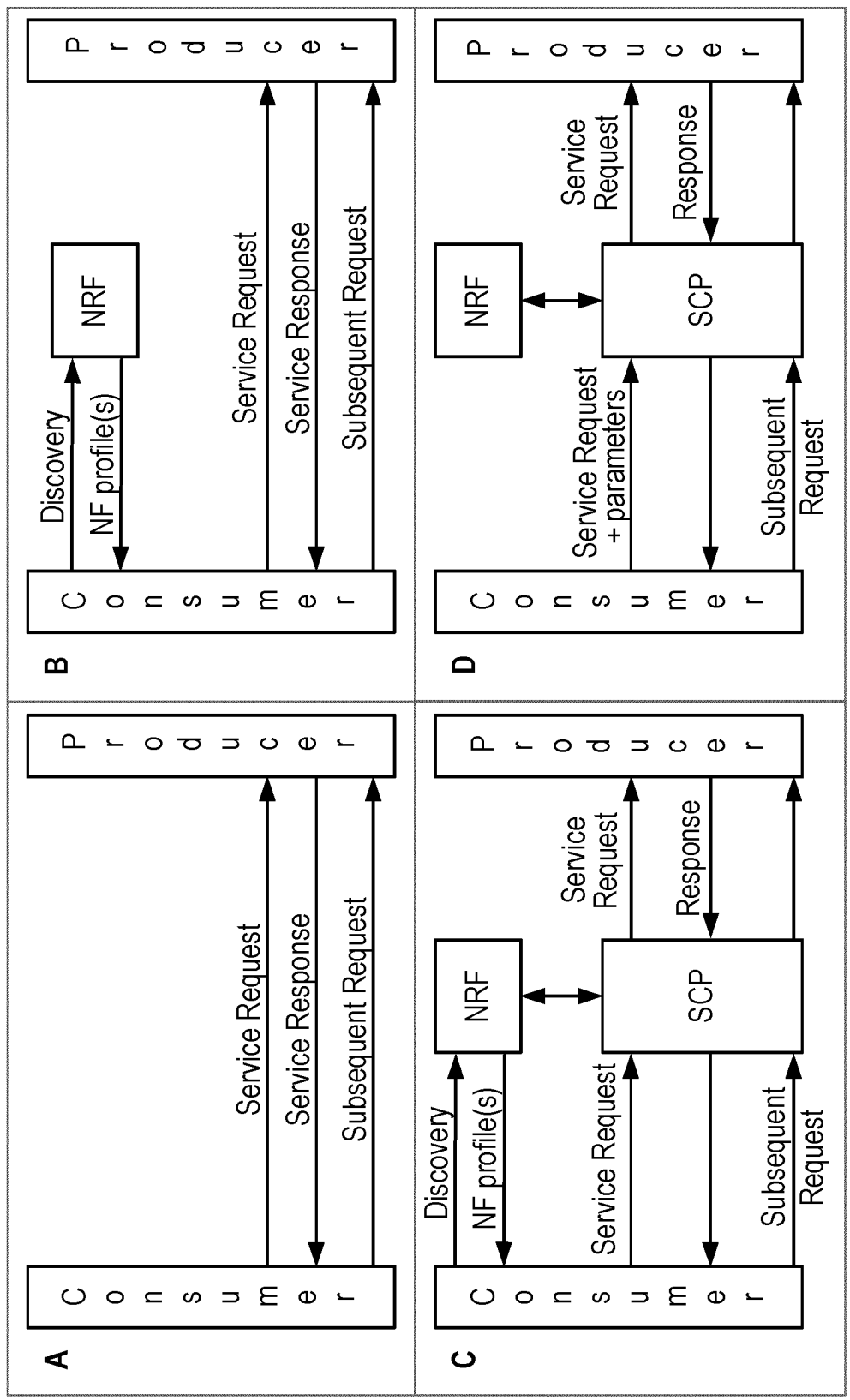
FIG. 1A-D is a block diagram illustrating different existing systems.
Figure 2A:
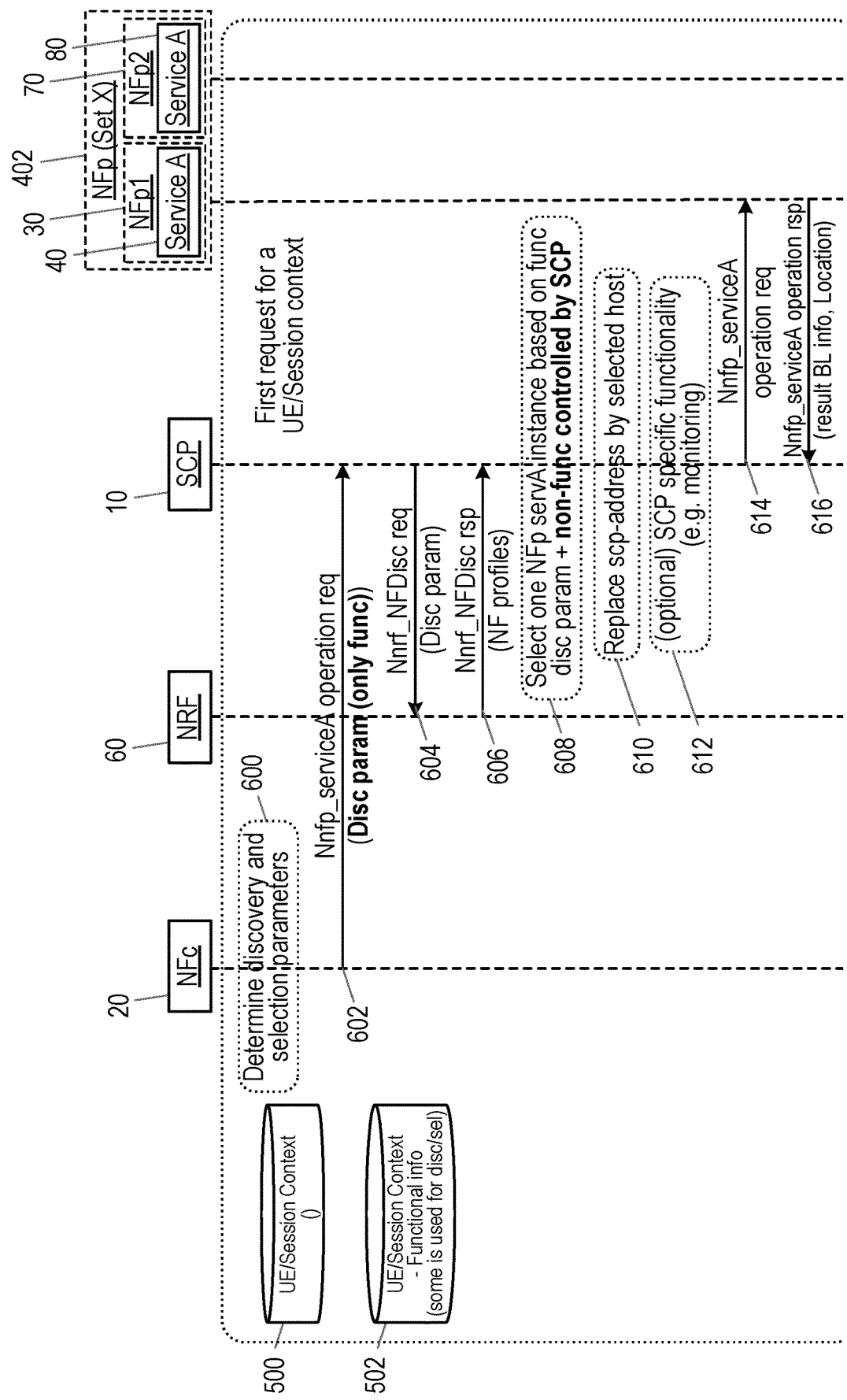
FIG. 2A-C is a signalling diagram illustrating an exchange of signals in an existing system.
Figure 2B:
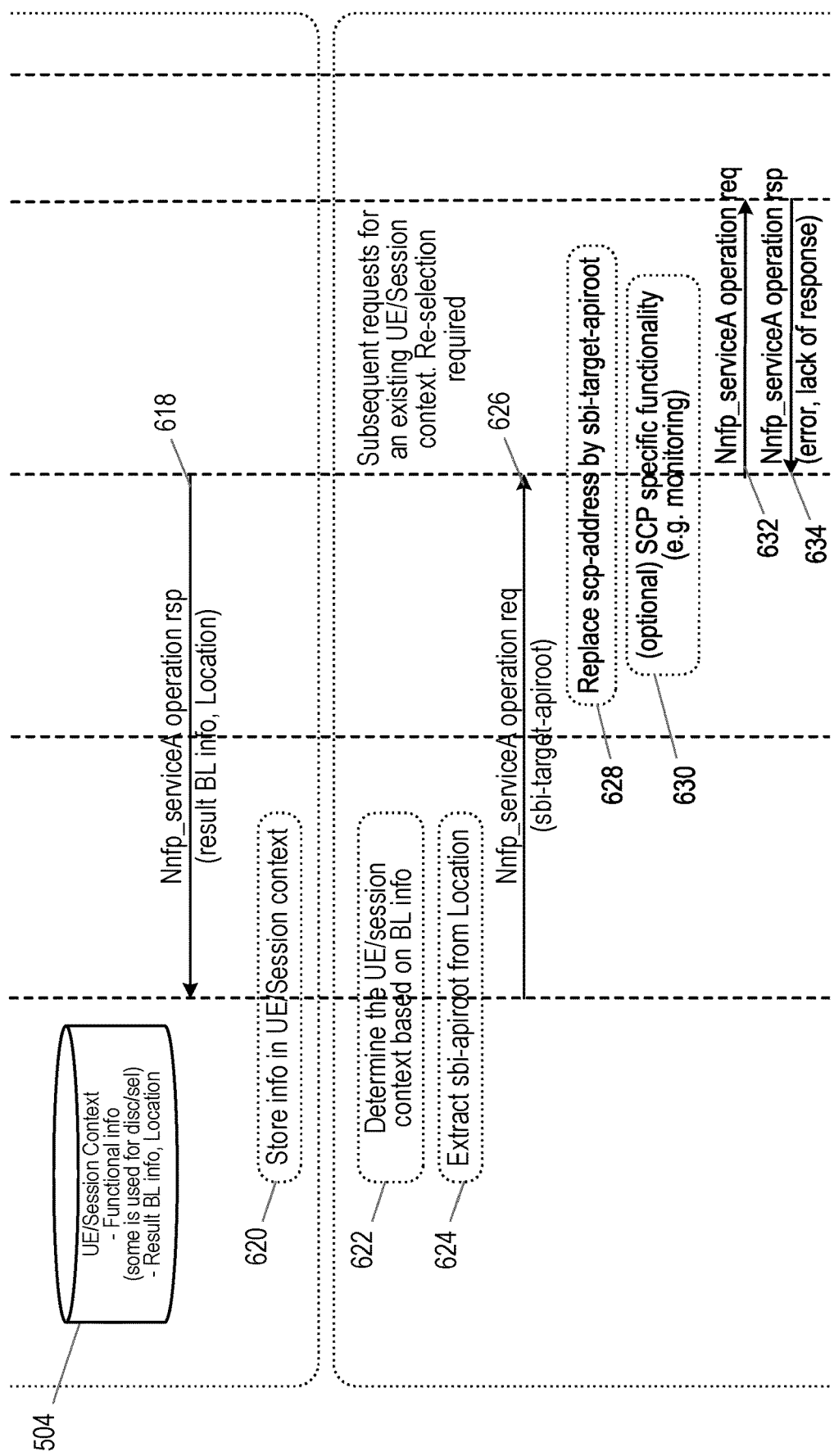
Figure 2C:
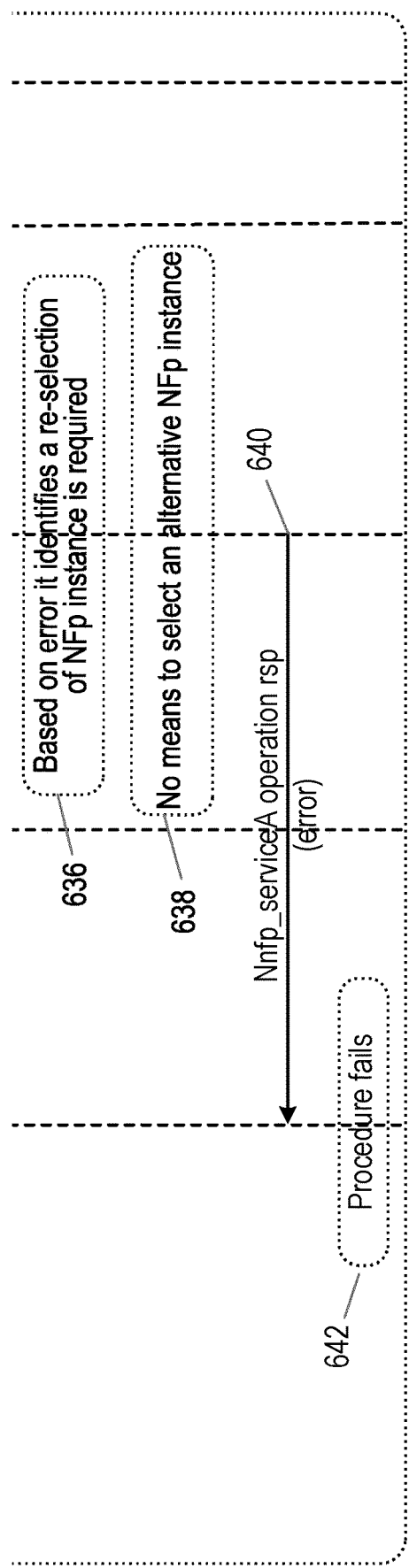

Steps 500-502 and 600-616 of FIG. 5A-C are as described earlier with reference to FIG. 2A-C. As illustrated by block 700 of FIG. 5A-C, in some embodiments, the first SCP node 10 may check whether the first NF node 20 supports being bound by the one or more parameters. That is, the first SCP node 10 checks whether the first NF node 20 supports binding.

In some embodiments, the first SCP node 10 may check an NF profile of the first NF node 20 to check whether the first NF node 20 supports being bound by the one or more parameters. The NF profile of the first NF node 20 may be stored in a memory 14 of the first SCP node 10 (e.g. it may be a cached result from previous discovery) and/or stored at the NRF node 60. Where the NF profile of the first NF node 20 is stored at the NRF node 60, the first SCP node 10 may use discovery to check the NF profile. For example, the first SCP node 10 may initiate transmission of a request towards the NRF node 60 to check the NF profile of the first NF node 20. The first SCP node 10 may use an identifier that (e.g. uniquely) identifies the first NF node 20 for this purpose, such as an NF instance Id. The identifier that identifies the first NF node 20 may be included in the first request 602. Thus, the first SCP node 10 may acquire the identifier that identifies the first NF node 20 from the first request 602. In this way, the first SCP node 10 is able to find the NF profile of the first NF node 20. In some embodiments, the first SCP node 10 may receive the NF profile from the NRF node 60. In some embodiments, the first SCP node 10 check whether the first NF node 20 supports binding by checking the supported features in the NF profile.

In some embodiments, the first SCP node 10 may check whether the first NF node 20 supports being bound by the one or more parameters only if the binding information is absent from (i.e. not included in) the first response 616 from the second NF node 30. If the first response 616 from the second NF node 30 does not include binding information, it may mean that the second NF node 30 does not support binding or that the second NF node 30 has decided not to include binding information.

As illustrated by block 702 of FIG. 5A-C, the first SCP node 10 includes binding information in a second response 704 to the first request 602, which is to be transmitted to the first NF node 20. Thus, the second response 704 referred to herein comprises binding information. In effect, the first SCP node 10 can insert its own binding information, as if it received it from the second NF node 30. This is possible since the first SCP node 10 has all the binding information to be included, e.g. an identifier that (e.g. uniquely) identifies the second NF node 30 (or the selected instance of the second NF node 30, e.g. NFp instance Id), an identifier that (e.g. uniquely) identifies the set 402 of NF nodes that comprises the second NF node 30 (e.g. NFp Set X Id), and a name of the first service 40 (e.g. Service A). The identifier that identifies the set 402 of NF nodes that comprises the second NF node 30 can be acquired from the NF profile of the second NF node 30. The name of the first service 40 may be included in the discovery parameters received in the first request 602.

In some embodiments, the first SCP node 10 may acquire the binding information from a memory 14 of the first SCP node 10 and/or from the NRF node 60. In some embodiments, the first SCP node 10 may initiate transmission of a third request towards the NRF node 60 for the binding information. The binding information stored in the memory 14 of the first SCP node 10 may be local binding information (e.g. the same binding information stored in the NRF node 60 may also be stored at the first SCP node 10), or cached binding information from previous interactions with the NRF node 60.

The first SCP node 10 includes the binding information in the second response 704 irrespective of whether the binding information is present in the first response 616. Thus, the second response 704 comprises binding information irrespective of whether the binding information is present in the first response 616. In some embodiments, the first SCP node 10 may check whether the binding information is present in or absent from the first response 616. If binding information is present in the first response 616, the second response 704 is the same as the first response 616, or the second response 704 may be the first response 616 updated to comprise modified binding information. For example, it may be the case that the second NF node 30 is programmed to send binding information that does not specify an alternative NF node of the service producer to be used when a subsequent second transmitted to the second NF node 30 is unsuccessful. This may be the case, for example, where only the second NF node 30 is deployed at the time the second NF node 30 sent the binding information. However, the third NF node 70 may be added later, e.g. to the set 402 of NF nodes. Then, even though the second NF node 30 did not send binding information relating to the third NF node 70, the first SCP node 10 can modify the binding information to comprise binding information relating to the third NF node 70. In this way, if an NF node reselection is required in the future, the first SCP node 10 has the information available to select an alternative.

On the other hand, if the binding information is absent from the first response 616, the second response 704 is the first response 616 updated to comprise the binding information. In some embodiments, the first SCP node 10 may include binding information in the second response 704 only if the first NF node 20 supports binding. Thus, in some embodiments, the second response 704 may comprise the binding information only if the first NF node 20 supports being bound by the one or more parameters. In some embodiments, when the second NF node 30 does not support binding but the first NF node 20 does support binding, the first SCP node 10 may include the binding information in the second response 704, since the second NF node 30 does not.

Herein, binding information is any information that is indicative of one or more parameters by which the first NF node 20 is bound when selecting a second service 40, 80 in an NF node 30, 70 of a service producer for a subsequent second request 712, 716. The subsequent second request 712, 716 can be a subsequent second request that follows the first request 602, 614 directly, or a subsequent second request that follows the first request 602, 614 indirectly, e.g. it may be a request that follows another one or more requests that follow the first request 602, 614. In some embodiments, the subsequent second request may be linked to the first service 40. For example, the subsequent second request may be associated with a resource used to provide the first service 40. The first service 40 and the second service 40 may be the same service, or the first service 40 and the second service 80 may be different services. The term "binding information" is well-recognised in the art and thus a person skilled in the art will be aware of various parameters that may be indicated by the binding information referred to herein. Nevertheless, some examples will be provided for completeness.

For example, in some embodiments, the one or more parameters may comprise a parameter that binds the first NF node 20 to selecting the second service 40, 80 in the second NF node 30 for the subsequent second request 712, 716, or a parameter that binds the first NF node 20 to selecting the second service 40, 80 in a third NF node 70 for the subsequent second request 712, 716. In some embodiments, the parameter that binds the first NF node 20 to selecting the second service 40, 80 in the second NF node 30 for the subsequent second request 712, 716 comprises an identifier that (e.g. uniquely) identifies the second NF node 30 and/or the parameter that binds the first NF node 20 to selecting the second service 40, 80 in the third NF node 70 for the subsequent second request 712, 716 comprises an identifier that (e.g. uniquely) identifies the set 402 of NF nodes. In some embodiments, as mentioned earlier, the binding information can comprise an identifier that (e.g. uniquely) identifies the second NF node 30 (or the selected instance of the second NF node 30, e.g. NFp instance Id), an identifier that (e.g. uniquely) identifies the set 402 of NF nodes that comprises the second NF node 30 (e.g. NFp Set X Id), and a name of the first service 40 (e.g. Service A). Other examples of one or more parameters that the binding information may comprise are those in Table 6.3.1.0-1 of 3GPP TS 23.501 V16.5.0.

As illustrated by arrow 704 of FIG. 5A-C, the first SCP node 10 initiates transmission of the second response 704 towards the first NF node 20. Thus, in response to receiving, from the second NF node 30, a first response 616 to the first request 602, 614 transmitted towards the second NF node 30 via the first SCP node 10, the first SCP node 10 initiates transmission of the second response 704 towards the first NF node 20. The second response 704 comprises the binding information indicative of the one or more parameters by which the first NF node 20 is bound when selecting a second service 40, 80 in an NF node 30, 70 of a service producer for a subsequent second request 712, 716. In embodiments where the first SCP node 10 initiates transmission of the third request towards the NRF node 60 for the binding information, the first SCP node 10 may initiate transmission of the second response 704 towards the first NF node 20 in response to receiving the binding information from the NRF node 60. In some embodiments, the second response 704 can also comprise information (e.g. one or more values) corresponding to the NFp selection.

As illustrated by blocks 706 and 708 of FIG. 5A-C, in some embodiments, the first NF node 20 may control a memory (such as the memory 24 of the first NF node or another memory) to store the received binding information. The first NF node 20 may control the memory to store the received binding information, e.g. with the UE/session context.

Step 622 of FIG. 5A-C is as described earlier with reference to FIG. 2A-C. As illustrated by block 710 of FIG. 5A-C, like block 624 of FIG. 2A-C, the first NF node 20 extracts the first NF node 20, from the location information, an address of the second NF node 30, which may be an application programming interface (API) root of a uniform resource identifier (URI) used to reach of the second NF node 30 (i.e. the sbi-target-apiroot). However, as illustrated by block 710 of FIG. 5A-C, the first NF node 20 also retrieves, from the memory, the stored binding information and includes this binding information in the subsequent second request. As illustrated by arrow 712 of FIG. 5A-C, the first NF node 20 initiates transmission of the subsequent second request, which comprises the binding information, towards the first SCP node 10. The subsequent service request can also comprise the address of the second NF node 30 (e.g. the sbi-target-apiroot).

Steps 628-636 of FIG. 5A-C are as described earlier with reference to FIG. 2A-C. However, the first SCP node 10 now has the means (by way of the binding information) to take action to fulfil the subsequent second request. For example, the binding information may comprise a parameter that binds the first NF node 20 to selecting the second service 40, 80 in a third NF node 70 for the subsequent second request 712, 716 if reselection of an NF node of the service producer is required. In some embodiments, this parameter may comprise an identifier that (e.g. uniquely) identifies the set 402 of NF nodes, such that an NF node in the same set 402 can be selected. Thus, as illustrated by block 714 of FIG. 5A-C, the first SCP node 10 can select another NF node of the service producer. For example, the first SCP node 10 may check NF profiles to find those that comprise the identifier that identifies the set 402 of NF nodes, such that an NF node in the same set 402 can be selected. The NF profiles may be stored in a memory 14 of the first SCP node 10 (e.g. from earlier discovery) and/or at the NRF node 60.

For the purpose of the illustration, it is assumed that the first SCP node 10 selects the third NF node 70. Thus, as illustrated by arrow 716 of FIG. 5A-C, the first SCP node 10 initiates transmission of the subsequent second request towards the third NF node 70. As illustrated by arrow 718 of FIG. 5A-C, the third NF node 70 initiates transmission of a response to the subsequent second request towards the first SCP node 10. As in the illustration, the response can be indicative that the subsequent second request is successful. The response can comprise some business logic (BL) information and/or binding information. As illustrated by arrow 720 of FIG. 5A-C, the first SCP node 10 initiates transmission of a response to the subsequent second request towards the first NF node 20. The response comprises the result that the subsequent second request is successful and optionally also the BL information and/or the binding information. As illustrated by blocks 722 and 724 of FIG. 5A-C, the first NF node 20 may store the result, the BL information, and/or the binding information e.g. with the UE/session context.

Figure 6:
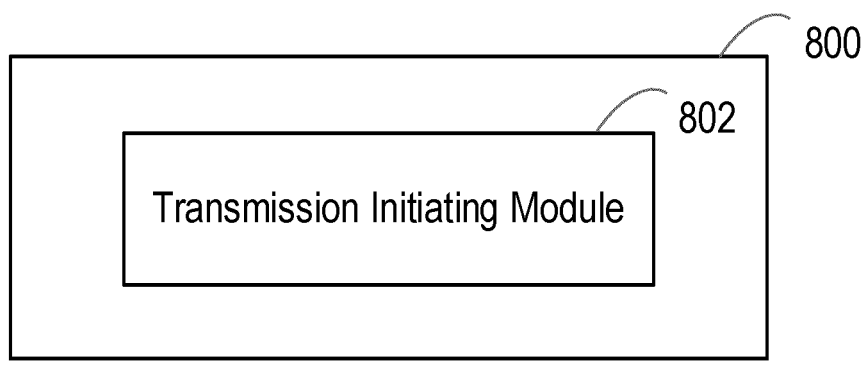
FIG. 6 is a block diagram illustrating a first SCP node according to an embodiment.

FIG. 6 is a block diagram illustrating a first SCP node 800 in accordance with an embodiment. The first SCP node 800 can handle a service request in a network. The first SCP node 800 can operate as an SCP between a first NF node of a service consumer and a second NF node of a service producer in the network. The first SCP node 800 can operate in response to receiving, from the second NF node, a first response to a first request transmitted towards the second NF node via the first SCP node. The first request is for the second NF node to provide a first service requested by the first NF node. The first SCP node 800 comprises a transmission initiating module 802 configured to initiate transmission of a second response towards the first NF node. The second response comprises binding information irrespective of whether the binding information is present in the first response. The binding information is indicative of one or more parameters by which the first NF node is bound when selecting a second service in an NF node of a service producer for a subsequent second request. The first SCP node 800 may operate in the manner described herein in respect of the first SCP node.

There is also provided a computer program comprising instructions which, when executed by processing circuitry (such as the processing circuitry 12 of the first SCP node 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the first SCP node 10 described earlier) to cause the processing circuitry to perform at least part of the method described herein. There is provided a computer program product comprising a carrier containing instructions for causing processing circuitry (such as the processing circuitry 12 of the first SCP node 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

Other embodiments include those defined in the following numbered statements:

Embodiment 1. A method for handling a service request in a network, wherein the method is performed by a first service communication proxy, SCP, node (10) that is configured to operate as an SCP between a first network function, NF, node (20) of a service consumer and a second NF node (30) of a service producer in the network, the method comprising:
　in response to receiving, from the second NF node (30), a first response (616) to a first request (602, 614) transmitted towards the second NF node (30) via the first SCP node (10), wherein the first request (602, 614) is for the second NF node (30) to provide a first service (40) requested by the first NF node (20):
　　initiating (102) transmission of a second response (704) towards the first NF node (20), wherein the second response (704) comprises binding information irrespective of whether the binding information is present in the first response (616), and wherein the binding information is indicative of one or more parameters by which the first NF node (20) is bound when selecting a second service (40, 80) in an NF node (30, 70) of a service producer for a subsequent second request (712, 716).

Embodiment 2. A method according to Embodiment 1, wherein:
the first service (40) and the second service (40, 80) are the same service; or
the first service (40) and the second service (40, 80) are different services.

Embodiment 3. A method according to Embodiment 1 or 2, wherein:
the one or more parameters comprise:
a parameter that binds the first NF node (20) to selecting the second service (40, 80) in the second NF node (30) for the subsequent second request (712, 716); or
a parameter that binds the first NF node (20) to selecting the second service (40, 80) in a third NF node (70) for the subsequent second request (712, 716), wherein a set of NF nodes of the service producer comprises the second NF node (30) and the third NF node (70).

Embodiment 4. A method according to Embodiment 3, wherein:
the parameter that binds the first NF node (20) to selecting the second service (40, 80) in the second NF node (30) for the subsequent second request (712, 716) comprises an identifier that identifies the second NF node (30); and/or
the parameter that binds the first NF node (20) to selecting the second service (40, 80) in the third NF node (70) for the subsequent second request (712, 716) comprises an identifier that identifies the set of NF nodes.

Embodiment 5. A method according to any of Embodiments 1 to 4, wherein:
the binding information is acquired from a memory of the first SCP node (10) and/or from a network repository function, NRF, node (60).

Embodiment 6. A method according to Embodiment 5, the method comprising:
initiating transmission of a third request towards the NRF node (60) for the binding information; and
initiating (102) transmission of the second response (704) towards the first NF node (20) in response to receiving the binding information from the NRF node (60).

Embodiment 7. A method according to any of Embodiments 1 to 6, wherein:
if the binding information is present in the first response (616), the second response (704) is the same as the first response (616) or the second response (704) is the first response (616) updated to comprise modified binding information; or
if the binding information is absent from the first response (616), the second response (704) is the first response (616) updated to comprise the binding information.

Embodiment 8. A method according to any of Embodiments 1 to 7, the method comprising:
checking whether the binding information is present in or absent from the first response (616).

Embodiment 9. A method according to any of Embodiments 1 to 8, wherein:
the second response (704) comprises the binding information only if the first NF node (20) supports being bound by the one or more parameters.

Embodiment 10. A method according to any of Embodiments 1 to 9, the method comprising:
checking (700) whether the first NF node (20) supports being bound by the one or more parameters.

Embodiment 11. A method according to Embodiment 10, the method comprising:
checking (700) whether the first NF node (20) supports being bound by the one or more parameters only if the binding information is absent from the first response (616).

Embodiment 12. A method according to Embodiment 10 or 11, wherein:
checking (700) whether the first NF node (20) supports being bound by the one or more parameters comprises:
checking an NF profile of the first NF node (20) to check whether the first NF node (20) supports being bound by the one or more parameters.

Embodiment 13. A method according to any of Embodiments 1 to 12, wherein:
the first SCP node (10) and the first NF node (20) are deployed in independent deployment units; and/or
the first SCP node (10) and the second NF node (30) are deployed in independent deployment units.

Embodiment 14. A method according to any of Embodiments 1 to 12, wherein:
the first SCP node (10) is deployed as a distributed network element.

Embodiment 15. A method according to Embodiment 14, wherein:
part of the first SCP node (10) is deployed in the same deployment unit as the first NF node (20); and/or
part of the first SCP node (10) is deployed in the same deployment unit as the second NF node (30).

Embodiment 16. A method according to any of Embodiments 1 to 15, wherein:
at least one second SCP node is configured to operate as an SCP between the first NF node (20) and the first SCP node (10); and/or
at least one third SCP node is configured to operate as an SCP between the first SCP node (10) and the second NF node (30).

Embodiment 17. A method according to Embodiment 16, wherein:
the first SCP node (10) and one or both of the at least one second SCP node and the at least one third SCP node are deployed in independent deployment units.

Embodiment 18. A method according to Embodiment 16, wherein:
the at least one second SCP node and/or the at least one third SCP node are deployed as distributed network elements.

Embodiment 19. A method according to any of Embodiments 1 to 18, wherein:
an entity comprises the first SCP node (10) and a network repository function, NRF node (60).

Embodiment 20. A first SCP node (10) comprising:
processing circuitry (12) configured to operate in accordance with any of Embodiments 1 to 19.

Embodiment 21. A first SCP node (10) according to Embodiment 20, wherein:
the first SCP node (10) comprises:
at least one memory (14) for storing instructions which, when executed by the processing circuitry (12), cause the first SCP node (10) to operate in accordance with any of Embodiments 1 to 19.

Embodiment 22. A computer program comprising instructions which, when executed by processing circuitry, cause the processing circuitry to perform the method according to any of Embodiments 1 to 19.

Embodiment 23. A computer program product, embodied on a non-transitory machine-readable medium, comprising instructions which are executable by processing circuitry to cause the processing circuitry to perform the method according to any of Embodiments 1 to 19.

In some embodiments, the first SCP node functionality described herein can be performed by hardware. Thus, in some embodiments, the first SCP node 10 described herein can be a hardware node. However, it will also be understood that optionally at least part or all of the first SCP node functionality described herein can be virtualized. For example, the functions performed by the first SCP node 10 described herein can be implemented in software running on generic hardware that is configured to orchestrate the node functionality. Thus, in some embodiments, the first SCP node 10 described herein can be a virtual node. In some embodiments, at least part or all of the first SCP node functionality described herein may be performed in a network enabled cloud. The first SCP node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there is advantageously provided an improved technique for handling service requests in a network. The first SCP node 10 includes binding information in the second response 704, e.g. on behalf of the second NF node 30 when the second NF node 30 does not provide such binding information. In this way, binding will be possible irrespective of whether it is supported by the second NF node 30. Moreover, even when the second NF node 30 does not support binding, the first SCP node 10 still does not need to store the UE/session context. In this way, storage resources can be conserved.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling a service request in a network, the method being performed by a first service communication proxy (SCP) node that is configured to operate as an SCP between a first network function (NF) node of a service consumer and a second NF node of a service producer in the network, the method comprising:
   checking, by the first SCP node, whether the first NF node supports being bound by one or more parameters when a first response is received from the second NF node to a first request transmitted towards the second NF node via the first SCP node, the first request being for the second NF node to provide a first service requested by the first NF node, and binding information, which is indicative of the one or more parameters by which the first NF node is bound when selecting a second service in an NF node of a service producer is absent from the first response; and
   initiating, by the first SCP node, transmission of a second response towards the first NF node in response to receiving, from the second NF node, the first response t;

the second response comprising the binding information when the first NF node supports being bound by the one or more parameters or, when the first NF node does not support being bound by the one or more parameters, the first SCP node inserts the one or more parameters in the second response and the binding information being indicative of the one or more parameters by which the first NF node is bound when selecting a second service in an NF node of a service producer.

2. The method as claimed in claim 1, wherein:
   the first service and the second service are the same service; or
   the first service and the second service are different services.

3. The method as claimed in claim 2, wherein:
   the one or more parameters comprise:
   a parameter that binds the first NF node to selecting the second service in the second NF node for the subsequent second request; or
   a parameter that binds the first NF node to selecting the second service in a third NF node for the subsequent second request, wherein a set of NF nodes of the service producer comprises the second NF node and the third NF node.

4. The method as claimed in claim 3, wherein one or both of:
   the parameter that binds the first NF node to selecting the second service in the second NF node for the subsequent second request comprises an identifier that identifies the second NF node; and
   the parameter that binds the first NF node to selecting the second service in the third NF node for the subsequent second request comprises an identifier that identifies the set of NF nodes.

5. The method as claimed in claim 2, wherein:
   the binding information is acquired from one or both of a memory of the first SCP node and from a network repository function (NRF) node.

6. The method as claimed in claim 5, the method comprising:
   initiating transmission of a third request towards the NRF node for the binding information; and
   initiating transmission of the second response towards the first NF node in response to receiving the binding information from the NRF node.

7. The method as claimed in claim 2, wherein:
   if the binding information is absent from the first response, the second response is the first response updated to comprise the binding information.

8. The method as claimed in claim 2, the method comprising:
   checking whether the binding information is present in or absent from the first response.

9. The method as claimed in claim 1, wherein:
   the one or more parameters comprise:
   a parameter that binds the first NF node to selecting the second service in the second NF node for the subsequent second request; or
   a parameter that binds the first NF node to selecting the second service in a third NF node for the subsequent second request, wherein a set of NF nodes of the service producer comprises the second NF node and the third NF node.

10. The method as claimed in claim 9, wherein one or both of:
    the parameter that binds the first NF node to selecting the second service in the second NF node for the subsequent second request comprises an identifier that identifies the second NF node; and the parameter that binds the first NF node to selecting the second service in the third NF node for the subsequent second request comprises an identifier that identifies the set of NF nodes.

11. The method as claimed in claim 1, wherein:
the binding information is acquired from one or both of a memory of the first SCP node and from a network repository function, NRF, node.

12. The method as claimed in claim 11, the method comprising:
initiating transmission of a third request towards the NRF node for the binding information; and
initiating transmission of the second response towards the first NF node in response to receiving the binding information from the NRF node.

13. The method as claimed in claim 1, wherein:
if the binding information is absent from the first response, the second response is the first response updated to comprise the binding information.

14. The method as claimed in claim 1, the method comprising:
checking whether the binding information is present in or absent from the first response.

15. The method as claimed in claim 14, wherein:
checking whether the first NF node supports being bound by the one or more parameters comprises:
checking an NF profile of the first NF node to check whether the first NF node supports being bound by the one or more parameters.

16. A first SCP node that is configured to operate as an SCP between a first network function (NF) node of a service consumer and a second NF node of a service producer in the network, the first SCP node comprising:
processing circuitry;
at least one memory for storing instructions which, when executed by the processing circuitry, cause the first SCP node to:
check, by the first SCP node, whether the first NF node supports being bound by one or more parameters when a first response is received from the second NF node to a first request transmitted towards the second NF node via the first SCP node, the first request being for the second NF node to provide a first service requested by the first NF node, binding information, which is indicative of the one or more parameters by which the first NF node being bound when selecting a second service in an NF node of a service producer, is absent from the first response; and
initiate, by the first SCP node, transmission of a second response towards the first NF node in response to receiving, from the second NF node, the first response;
the second response comprising
the binding information when the first NF node supports being bound by the one or more parameters or, when the first NF node does not support being bound by the one or more parameters, the first SCP node inserts the one or more parameters in the second response and the binding information being indicative of the one or more parameters by which the first NF node is bound when selecting a second service in an NF node of a service producer.

17. A non-transitory computer storage medium storing a computer program comprising instructions which, when executed by processing circuitry, cause the processing circuitry to perform a method for handling a service request in a network, the method being performed by a first service communication proxy (SCP) node that is configured to operate as an SCP between a first network function (NF) node of a service consumer and a second NF node of a service producer in the network, the method comprising:
checking whether the first NF node supports being bound by one or more parameters;
initiating, by the first SCP node, transmission of a second response towards the first NF node in response to receiving, from the second NF node, the first response t;
the second response comprising
the binding information when the first NF node supports being bound by the one or more parameters or, when the first NF node does not support being bound by the one or more parameters, the first SCP node inserts the one or more parameters in the second response and the binding information being indicative of the one or more parameters by which the first NF node is bound when selecting a second service in an NF node of a service producer.

* * * * *